(12) United States Patent
Duta (10) Patent No.: US 10,713,524 B2
(45) Date of Patent: Jul. 14, 2020

(54) KEY VALUE EXTRACTION FROM DOCUMENTS

(71) Applicant: Microsoft Technology Licensing, LLC, Redmond, WA (US)

(72) Inventor: Nicolae Duta, Brighton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 16/156,643

(22) Filed: Oct. 10, 2018

(65) Prior Publication Data

US 2020/0117944 A1     Apr. 16, 2020

(51) Int. Cl.
*G06K 9/46* (2006.01)

(52) U.S. Cl.
CPC .................. *G06K 9/4642* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,042,653 B2 * | 5/2015 | Lin | ........... | G06F 40/18 382/181 |
| 2007/0053611 A1 * | 3/2007 | Wnek | ........... | G06K 9/00469 382/294 |
| 2014/0369602 A1 * | 12/2014 | Meier | ........... | G06K 9/00463 382/182 |
| 2017/0330049 A1 * | 11/2017 | Kalyuzhny | ........... | G06K 9/50 |

FOREIGN PATENT DOCUMENTS

EP     1580666 A2     9/2005

OTHER PUBLICATIONS

"International Search Report and Written Opinion Issued in PCT Application No. PCT/US19/044008", dated Sep. 18, 2019, 12 Pages.

* cited by examiner

*Primary Examiner* — Tsung Yin Tsai
(74) *Attorney, Agent, or Firm* — Schwegman Lundberg & Woessner, P.A.

(57) ABSTRACT

Systems, methods, and computer-executable instructions for extracting key value data. Optical character recognition (OCR) text of a document is received. The y-coordinate of characters are adjusted to a common y-coordinate. The rows of OCR text are tokenized into tokens based on a distance between characters. The tokens are ordered based on the x,y coordinates of the characters. The document is clustered into a cluster based on the ordered tokens and ordered tokens from other documents. Keys for the cluster are determined from the first set of documents. Each key is a token from a first set of documents. A value is assigned to each key based on the tokens for the document, and values are assigned to each key for the other documents. The values for the document and the values for the other documents are stored in an output document.

20 Claims, 6 Drawing Sheets

HEATING AND SONS, INC
10 MAIN ST.
WALTHAM, MA 02454
781-555-1212

INVOICE

412 — 410 — Aug 31, 2017 — 414

| | |
|---|---|
| Account #: | 9092 |
| Invoice #: | 140134 |
| Transaction Date: | 8/18/17 |
| Invoice Total: | $135.69 |

TERMS: Net Due in 15 Days.

JOHN DOE
31 MAIN ST
BRIGHTON, MA 02135

Amount Enclosed: $ __________

............ *Please Return This Portion With Your Payment* ............

Problems / Actions Performed:
Adjusted

Description: PLUMBING SERVICE - RESET 1ST FLOOR TOILET — 420 — 422

| Quantity | Description | Unit Price | Amount |
|---|---|---|---|
| 1.0 | Plumbing Labor | $125.00 | $125.00 |
| 1.0 | 1/4 JOHNI-BOLTS | $7.96 | $7.96 |
| 1.0 | 90210 Regular Wax Seal Rings | $2.10 | $2.10 |

— 424

Sub Total: $135.06
416 — Tax Total: $0.63 — 418
Total Due: $135.69

*"CELEBRATING OVER 50 YEARS"*

— 452
Servicing all your Heating, Air Conditioning and Plumbing needs

440 —
For Fuel or Service At:

442 — JOHN DOE — 444 — 446
31 MAIN ST
BRIGHTON, MA 02135 — 448

450 — HEATING AND SONS, INC
10 MAIN ST.
WALTHAM, MA 02454
781-555-1212

ACCOUNT #: 9092
INVOICE #: 140134 — 432
DATE: 8/18/17

KEY VALUE EXTRACTION FROM DOCUMENTS

BACKGROUND

Forms are a common way to collect structured information. Examples of forms include invoices, receipts, purchase requests, tax forms, etc. A form can be any document that has key-value pairs. As an example, a key-value pair is an address label, the key, along with the data that represents an address, the value. Input into forms can include typed text or hand writing. As forms can include many different keys and different types of input, extracting the key-value pairs from forms cannot be done that same way for different types of forms. In addition, different types of input provide different challenges in extracting key-value pairs.

DETAILED DESCRIPTION

Companies and people gather large amounts of data in various digital documents, such as forms. Form are documents that have some structured data in the form of key-value pairs. Manually consolidating data from multiple forms can be a tedious and time-consuming operation. In addition, the data layouts and formats may not be consistent between different forms. This is especially true, when documents are from different sources. Accordingly, a system that looks for specific keywords or locations will only be able to process a limited number of forms or require multiple different configurations. In contrast, various disclosed examples identify keys within documents without interaction and without being provided any key or value locations. The extracted keys can be used to extract values for those keys from the documents. Thus, various examples provide a system that learns the keys from different types of forms and can then extract values for the keys. This extraction can be done without requiring input regarding keys, values, or layout of the documents.

Online data stores that store a large number of documents can leverage various examples to extract key-value data. For example, a cloud-based storage system may store a large collection of documents. The disclosed examples can process these documents without needing any information regarding the type of document, the format of the document, possible keys or values. Accordingly, a user of the cloud-based storage can leverage various examples to process their forms to efficiently extract key-value data without needing to learn how various forms are formatted. Disclosed examples, therefore, provide a useful tool to users of cloud-based storage systems.

Documents are commonly in an image format or portable document format (pdf). Regardless of the format, an optical character recognition (OCR) can be done on the document to generate a text version of the form. This text document can then be used to extract keys and values from tokens identified within the documents. In some examples, text can be extracted directly from the document without using OCR. The tokens may then be analyzed to determine if the token is a key, a value, or neither. In various embodiments, a common set of tokens are identified in a group of forms. These tokens can be considered the keys for the group of forms. The keys can then be used to locate and extract values for those keys. The extracted values from multiple documents can be consolidated in a consolidated document or database.

In an example, documents are searched for a table of data. A table includes a number of columns and one or more rows. For table data, the keys are determined from column headers and the values for each key are determined from identified table rows. A new table that consolidates the table data from multiple documents can be created. Thus, a new document can be generated that consolidates with the key-values and the table data from the various documents. Various described examples, therefore, provide for automatic key-value data extraction from a collection of documents without having to define the document layout.

Figure 1:
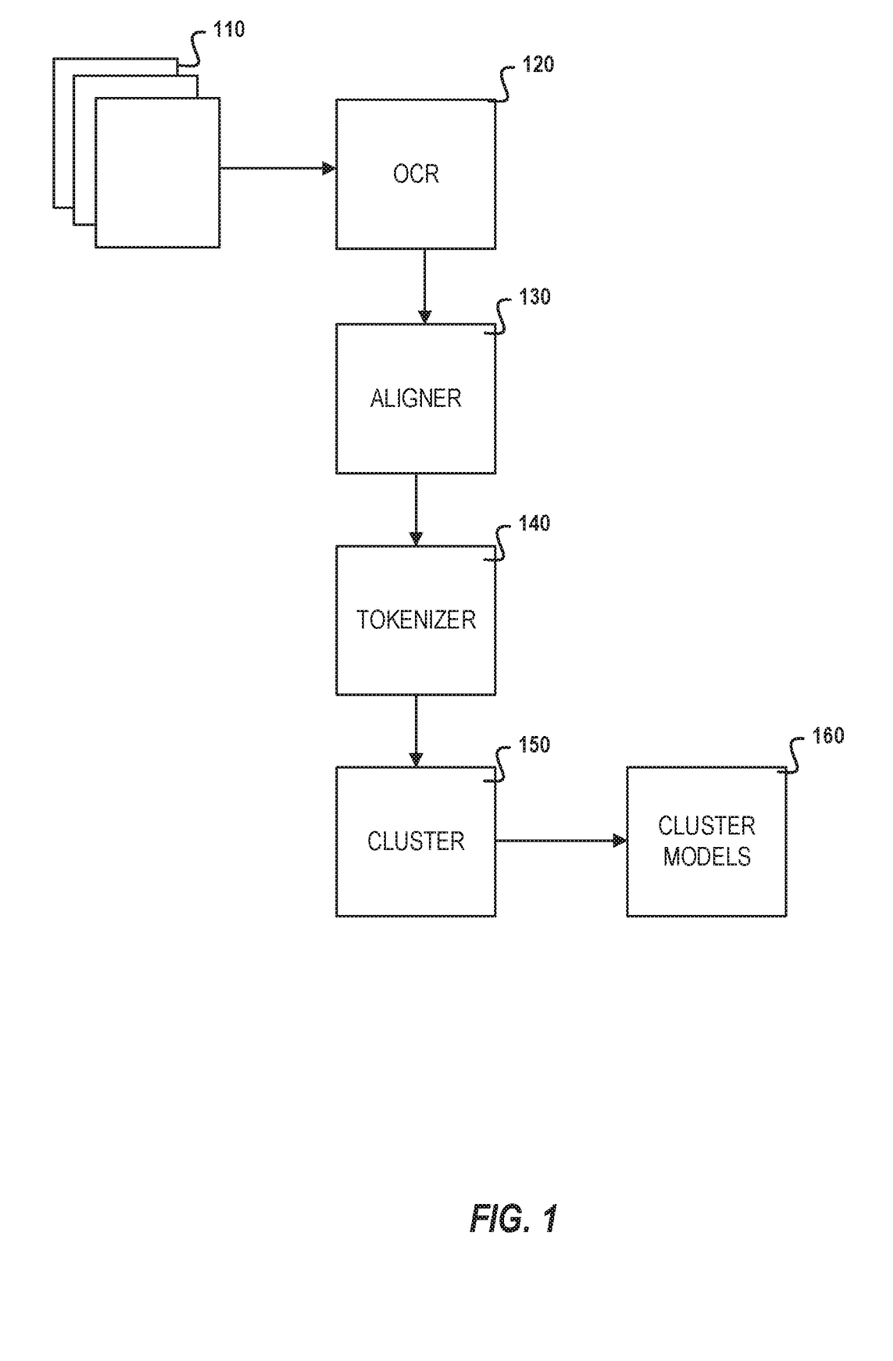
FIG. 1 is a block diagram of a system for clustering documents in accordance with respective examples.

FIG. 1 is a block diagram of a system for clustering documents in accordance with respective examples. Documents 110 may include a number of forms that include key-value data. The documents 110 may include forms from various sources, such that the documents 110 do not have a common format. The documents 110 may be in a PDF format or in an image format. An OCR system 120 is used to extract the text from the documents 110. In an example, images can be resized to a common height prior to the text recognition. The OCR system 120 may also extract non-text features such as table borders. In various examples, the output from the OCR system 120 is a list of characters and as associated x,y coordinate of where each character is located within a document. In addition, the OCR system 120 may provide a bounding box that indicates the height and width of a letter. In addition, the height and width of a letter may be determined from the font and font size of the character. The font and font size may be output from the OCR system 120. A row of text within a document may have slight variations in the y-coordinate of characters that are on a common row. The reason for this may be due to the document not being perfectly centered, e.g., a slightly tilted image, or variations in size of letters. For example, letters with a descent, e.g., y, may have a slightly different y-coordinate compared to letters without a descent, e.g., c. These letters, however, may all be on the same row of text within the document.

An aligner 130 may be used to correct the slight differences in the y-coordinate of letters. In an example, a character is considered to be on the same row of another character when the two characters overlap to some extent along the y-axis. For example, the overlap may be 50%, 70%, 75%, etc. In addition, the aligner 130 may require that the characters have the same size and font to be considered on the same row such that the y-coordinate of one character is changed. In an example, the characters from the OCR system are sorted by the y-coordinate of the characters. Then, starting from either the top or bottom, the next character is examined. If the next character overlaps with the previous character the y-coordinate of the next character is changed to be the same as the y-coordinate of the previous character. Thus, the two characters are put on the same row as text since they have the same y-coordinate. This mapping can continue for each character. Afterwards, rows of characters can be determined by sorting the characters first by the y-coordinate and then by the x-coordinate. In an example, the sorting is done from top-to-bottom and then from left-to-right. Other sorting may be done based on the reading direction of the text. For example, the sorting may be from top-to-bottom and right-to-left for right-to-left languages. In another example, the x-coordinate rather than the y-coordinate of the text may be used to adjust the characters into columns rather than rows. This may be done for top-to-bottom languages. In this example, columns would be processed in the same way as rows are processed for left-to-right or right-to-left languages.

A tokenizer 140 may take the ordered list of characters and create tokens. A token is one or more characters that are on the same row and near one another. In an example, two characters are considered near one another when they are not separated by more than a predefined spacing value. As an example, the spacing value may be the average width of a character for a font and font size. In an example, the OCR system 120 provides the font and font size for each character. In addition, the tokenizer 140 may require that characters not only be on the same row and near one another but may also require that the characters have the same font and also the same font size. In these examples, if the font or the font size differs between characters, the characters will not be part of the same token.

The tokens can then be used to cluster 150 the forms into cluster models 160. For example, the ordered tokens between forms may be used to cluster forms based on similarity. The similarity may be based on forms that include tokens in similar positions. A link between two forms is found when both forms include the same token. In an example, tokens are considered to be the same when the tokens are within a certain string distance/difference between them; thus, allowing fuzzy token matching. In some examples, the link is only considered when the tokens are in the same location within the ordered list of tokens. In some examples, the same location includes tokens that are proximate to one another. For example, tokens that are not in the exact same location in the ordered list of tokens, but are within 3, 5, 8, etc., tokens of one another. As another example, only tokens that are in increasing order of position within the document are considered. The number of links between forms can be used to cluster forms. For example, clusters can include forms that have a larger number of links between themselves compared to forms in other clusters. The clustered forms can be used to create cluster models.

For each cluster, a cluster model can be generated. The cluster model can include tokens that are considered keys for that cluster. A key of a document, is a token that is identified as a key that may have a corresponding value. The value is one or more tokens that are associated with the key. In an example, keys are identified from tokens when a token is found in a predetermined number of forms within the cluster. For example, if a token is in 30%, 40%, 50%, etc. or more of the documents in the cluster, the token is considered a key. The identified keys may then be used to extract values from documents that are in the cluster or new documents that are grouped into the cluster.

In some examples, a token may include both a key and a value that should be separated. For example, a form may include "Name: John Doe." The spacing may be such that the entire string, "Name: John Doe", is considered a token by the tokenizer 150. To account for these types of tokens, separators may be used to split the token into a key and the key's corresponding value. In another example, the tokenizer 150 may take into account separators to separate the initial token into multiple tokens when generating tokens.

In another example, keys can be generated when a document includes both text and handwriting. For example, a form may include text and be completed with handwriting. In this example, an OCR system provides an indication that the document includes handwriting. The OCR system can identify the typed characters as described in regard to the OCR system 120. In another example, a different OCR system is used to provide the indication that the form includes handwriting. A handwriting OCR system may then be used to extract the handwritten text. In this example, the typed tokens can be the keys and the handwritten text can be considered the values. In another example, a blank form may be processed, and the tokens identified in the blank form can be used as keys.

Figure 2:
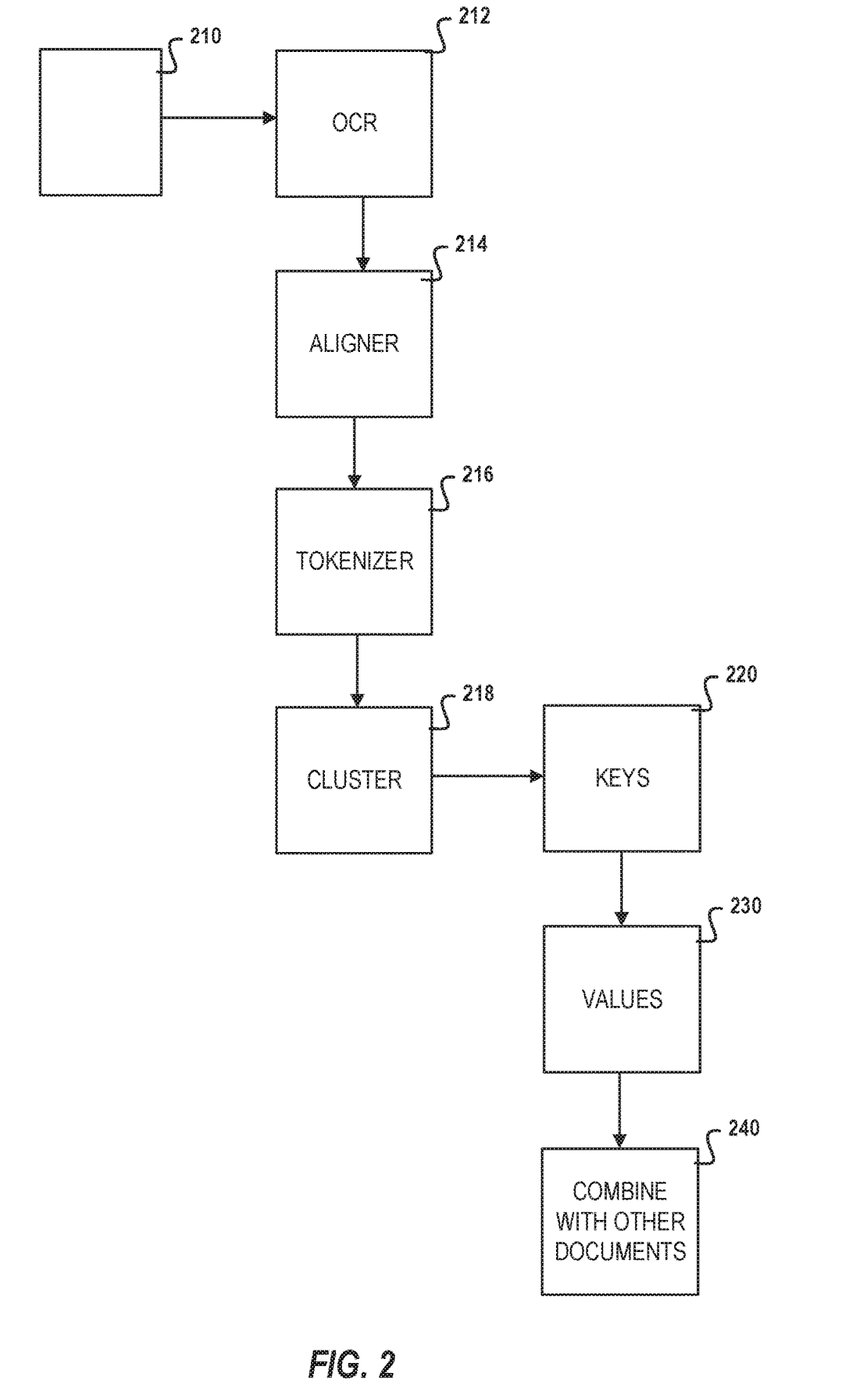
FIG. 2 is a block diagram of a system for extracting keys and values from documents in accordance with respective examples.

FIG. 2 is a block diagram of a system for extracting keys and values from documents in accordance with respective examples. A document 210 may be part of the documents 110 or may be a document that was not part of the documents 110 used to generate the cluster models. The document 210 is processed in a similar way to generating tokens as described in FIG. 1. An OCR system 212, such as the OCR system 120, is used to identify characters and the character locations within the document 210. The OCR system 120 may also provide the font and font size of the characters. An aligner 214 aligns rows of characters and a tokenizer 216 generates tokens from the aligned rows of characters. The tokens from the documents are used to cluster 218 the document 210. The cluster is used to identify a corresponding cluster model for the document 210. The cluster model is used to determine keys 220 for the document 210.

The keys 220 may then be used to extract values 230 for the keys from the document 210 from the tokens from the document. In an example, the location of a key within the ordered list of tokens for a document is used to determine the value of the key. For a key, tokens near the key are examined as possible values for the key. For example, a token to the right or below the key is used as a potential value. In some examples, tokens above and to the left of a key are not considered to be possible values of the key. In some examples, a token must have the same font and font size of the key to be considered to be a value of the key.

In addition, the distance between the key and a token may be used to determine if a token is a value for the key. In an example, multiple passes through the ordered list of tokens of the document 210 are done to identify values. The iterations increase the distance used to determine if a token can be a value for a key. For example, a first iteration may use an initial distance. If a token is less than the initial distance from a key, the token is considered a value for the key. The key and the value token may be restricted to being on the same row or with the value token being located below the key. The token and the key can then be marked as paired or removed from the list of tokens of the document. In later iterations, tokens and keys that are marked as paired can be ignored as possible values for other tokens. The paired tokens, however, can still be used to identify non-white space for determining if there is whitespace between a key and a token. Additional iterations may be done after analyzing the list of tokens. In an example, the distance can be increased to be more than half the width of a page. Such a large distance allows for values whose keys are far away to be captured.

The value of a key may be made up from multiple tokens. In an example, a token that is within the predetermined distance of a key is used as the value. If no such token is found, tokens below the key may be searched. In an example, only tokens that overlap with the key and are below the key are examined. If a key does not overlap a token, that token is not considered a value for the key. A token that is within the predetermined distance below the key can be considered a value. If additional tokens are below the value and within the predetermined distance of the value, that token may be considered part of the value. In some examples, there is a limit such that the value can only include tokens within a maximum distance from the key. For example, a maximum distance may limit the value of a key to being within three or four rows below the key. If there are additional tokens further below and within the predetermined distance of the value, those additional tokens are not part of the value based on the maximum value.

After the values 230 are determined from the document 210, the values 230 can be combined with values from other documents within the cluster 240. A new document can be generated that contains the combined values. Thus, various documents can be processed, and a summary of key-values can be generated.

Figure 3:
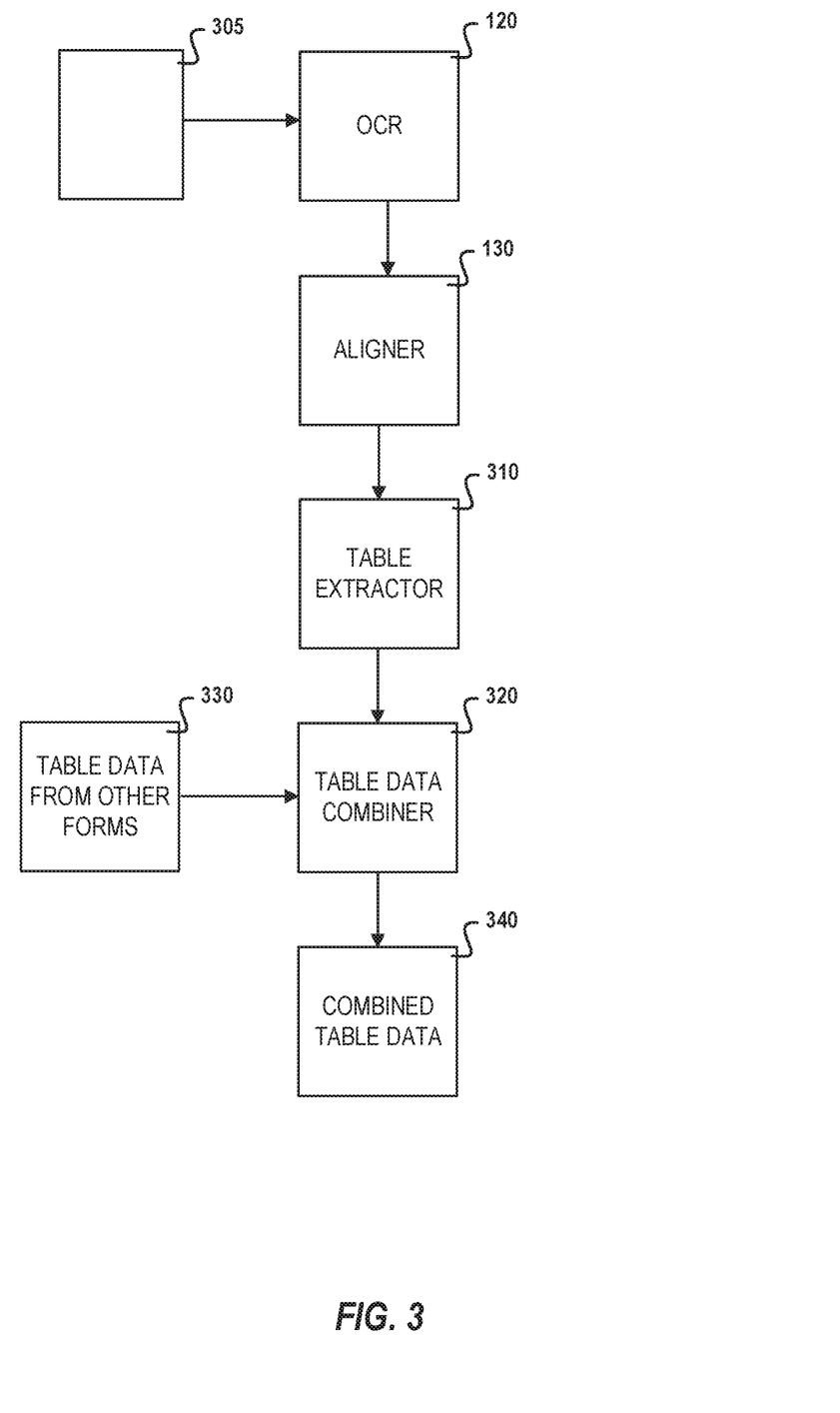
FIG. 3 is a block diagram of a system for extracting a table from documents in accordance with respective examples.

In addition to key-value extraction, various examples include extracting data from a table within a document 305. The table data may be extracted prior to the key-value determination to avoid the table data from being classified as key-value data. FIG. 3 is a block diagram of a system for extracting a table from documents in accordance with respective examples. After text from the document 304 is extracted via the OCR system 120 and aligned into rows via the aligner 130, table data can be searched for and extracted via a table extractor 310. In an example, the table extractor 310 first searches for a single table in the document. In this example, the aligned rows of text are sorted by the y-coordinate of the rows. Starting from the bottom, the row with the most number of tokens is found. If this row contains more than a predefined number of tokens and some of the tokens are numeric and some of the tokens are non-numeric, the row is considered the bottom table row. The rows above this row are then examined to determine if those rows are part of the table or the table header row. If a row above the bottom table row has the same number of tokens and also includes a numeric value token, then the row is considered a table row from the table body. In an example, the number of tokens in the row can be less than the number of tokens in the bottom table row and still be considered a table row. For example, if the row has n−2 tokens, where n is the number of tokens in the bottom table row, the row can be considered a table row. If the row has less than n−2 tokens, the row can be ignored.

If a row has more than n−2 tokens but does not contain any numeric values, the row is identified as the table header row. In another example, a row is classified as a table header row when there are less than 2, 3, etc. number of numeric tokens in the row. The tokens in the table header row can be considered the keys of the table or column names for the table. The table body rows contain the values that correspond with the table keys. The mapping of values to table columns can be based on the location of the column headers. In some examples, the number of tokens in a row will be less than the number of table columns. In this example, a token is determined to be a value of a header based on the location of the token and the header. For example, the token is considered to be a value of a column based on the token overlapping with the header based on the x-coordinate of the token and the column.

A table column may be made up of text that is on multiple rows. For each token considered to be part of the header row, additional tokens that overlap the token is determined. If there is a second token that overlaps along the x-axis and is vertically close to the header token, the second token is combined with the header token. As an example, a column header may be Total Amount, but with the words on different rows. If a token that represents the word Total is found as part of the header row, a token that overlaps with the Total token and represents Amount will be found. In addition, no other tokens will exist between the Total and Amount tokens. Accordingly, the header value can be determined to be "Total Amount." In addition, the header token can be a new token that represents the combined Total and Amount tokens.

Figure 4:
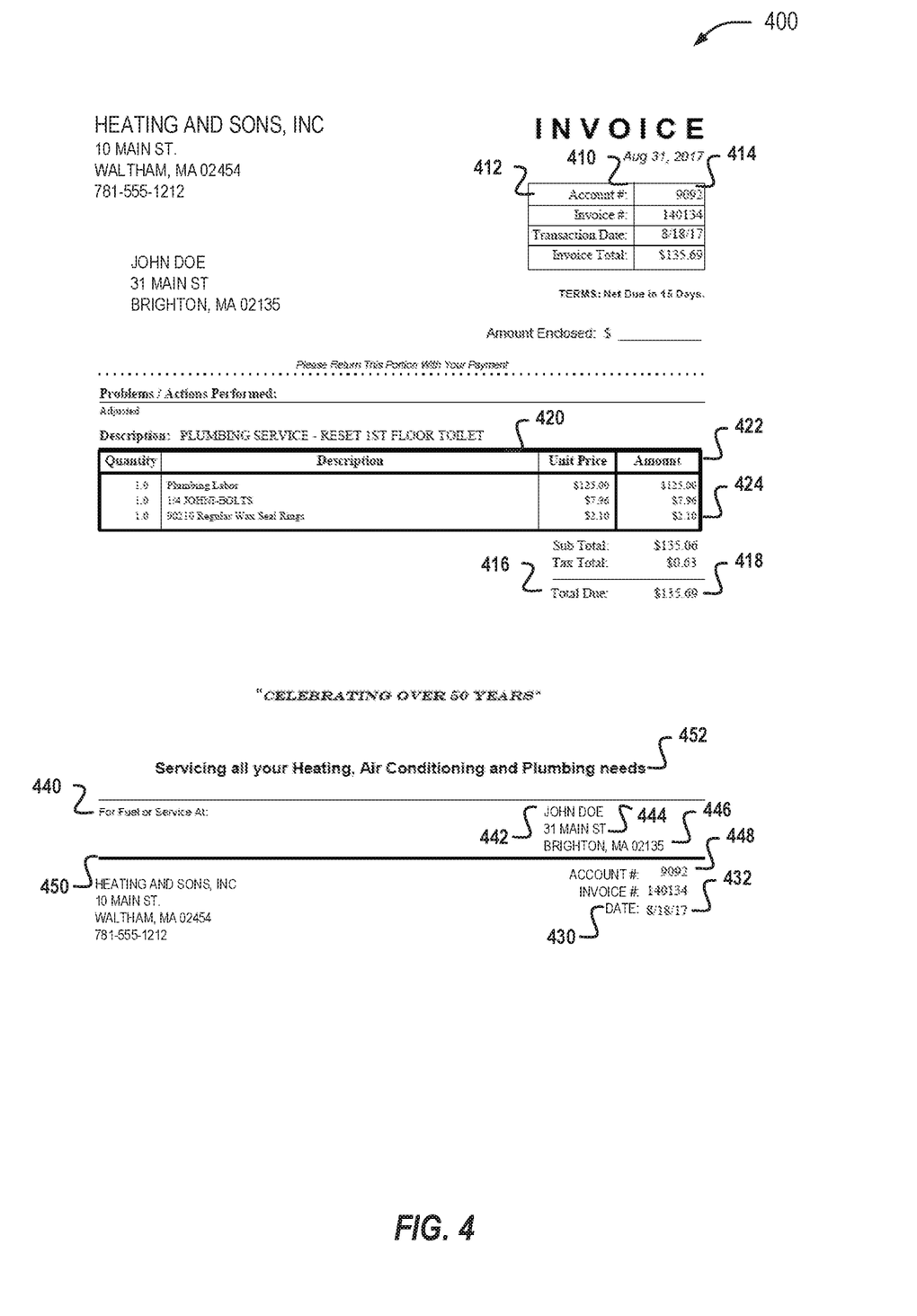
FIG. 4 is an example invoice whose key-values can be extracted in accordance with respective examples.

FIG. 4 is an example invoice 400 whose key-values can be extracted in accordance with respective examples. The invoice includes various information that will be duplicated across different invoices. For example, the address of Heating and Sons will be the same across all of the invoices from Heating and Sons. The invoice 400 includes tables 410 and 420 and key-values that are specific to the invoice 400. Using the extract process described herein, the tokens within the invoice 400 can be extracted after the invoice 400 is OCR'd and the recognized text is aligned. The tokens can include tokens that represent phrases 412, 416, 430, 440 and 450. Once the tokens are extracted, the invoice 400 can be clustered with other documents. In an example, there are multiple invoices from Heating and Sons, such that the invoice 400 is clustered with other invoices from Heating and Sons. A cluster model that includes tokens that are considered keys is determined based on the cluster.

After the keys for the invoice 400 are determined, values for each of the keys are determined. As described above, there are multiple iterations over the tokens from the invoice 400 to determine values for the keys. In an example, a key such as the token 412 is used to determine a value. Tokens to the right of the token 412, such as token 414, may be identified. The distance between the token 412 and the token 414 may be determined and if the distance is less than a distance parameter then the token 414 is the value for the key, e.g., Account #. In an example, the distance parameter is initially set to a small value and then increased with each iteration. For example, the distance parameter may be the width of six characters based on the size of the font of the key. Other starting examples can be the width of 8, 10, 12, 16, etc., characters. In an example, the distance is such that the token 414 is far enough away that the token 414 is not considered a value for the key 412 during the first iteration.

The token 430 can also be a key for the cluster model. The token 432 is close enough to the token 430 that the value for the key can be the token 432. Accordingly, the key-value for this is: "Date:"="8/18/17". After the value is determined, additional tokens below the token 432 can be considered. In this example, there are no additional tokens to consider. After finding a value, the key corresponding to the key 430 can be removed from the list of keys to extract from the invoice. In addition, the tokens 430 and 432 can be removed from the ordered list of tokens extracted from the invoice 400.

After the first iteration through the list of tokens, the distance parameter is increased. In an example, the distance parameter may be increased by the width of 4, 6, 10, 16, etc., characters. As another example, the distance parameter can be increased by a multiplier such as 1.25, 1.5, 2, etc. During a second iteration, values that are farther away from a key can be identified and determined to be a value. For example, the cluster model can include keys that correspond to tokens 412, 416, and 440. The token 412 can be identified as corresponding to the key from the cluster model. The distance between the token 412 and the token 414 can be determine and if the distance is less than the distance parameter then the token 414 is considered the value of the key 412, Account #. The token 416 and the token 418 are also close enough such that the token 418 is considered to be the value for the key 416.

In some examples, additional iterations can be done to extract additional key-value pairs. In some examples, there are four iterations done on the tokens from the invoice 400. The distance parameter can be increased with each iteration. In an example, the last iteration uses a distance parameter that is greater than one half the width of the invoice 400. When such a large distance parameter is used, the token 442 can be identified as a value to the key corresponding to the token 440. After the token 442 is identified as a value, additional tokens below the token 440 can be identified from the list of tokens extracted from the invoice 400. The possible additional tokens are tokens that have not been selected as values and are also not keys. One such token is token 444. The token 444 is below the token 442 and overlaps along the x-axis with the token 442. The vertical distance the token 442 and the token 444 is determined and if the distance is smaller than a vertical threshold, the token is added to the value. In an example, the vertical distance may be 4×, 6×, 8×, etc., the height of a character of a font corresponding to the font and size of the key. In this example, the distance is roughly one-character height so the token 444 is considered part of the value and is combined with the token 442. Token 446 is also considered as part of the value based on a similar determination of distance between the token 444 and the token 446.

In various examples, token 448 is not considered part of the value for the key 440. This can be because the token 448 has already been identified as a value in a previous iteration. The token 448 does not overlap with the token 442 along the x-axis. In some examples, the token 448 would not be considered part of the value since the token 448 is too vertically far from the token 442. In another example, the token 448 is not part of the value based on the horizontal line 450 being between the token 442 and the token 448.

Some tokens, such as the token 452, do not have any corresponding values. The token 452 does not have any tokens to the right or close enough below such that the token 452 does not have any values. Alternatively, the token 452 can be removed from the cluster model. In another example, the token 452 is included in the cluster model and identified as a non-value key. Accordingly, the token 452 can be used during the value extraction to limit values for keys. For example, a value to a key cannot have an intermediate key between the key and the possible value.

In an example, the table 420 can be extracted. The table 420 includes four different columns. Another table 410 only includes two columns. In an example, the table 420 is extracted since the table 420 includes more columns than the table 410. In this example, the values from the table 420 can be extracted as part of the key-value extraction process described above.

To identify the table 420, the ordered list of tokens is examined starting from the bottom of the invoice 400. The row with the most tokens is identified. If there are multiple rows that have the most tokens, the bottom most row, e.g., row 424, is used. In addition, the tokens of the row can be examined to determine if the tokens are numeric. In an example, only rows that have some numeric values are considered to be possible table rows. If a row of tokens does not include any numeric values, then the row may be considered the table header as described below. Starting from the bottom-most row, rows that are above the bottom-most row are identified. If the row includes a numeric value and the same number of tokens, the row is considered a table row. In an example, if the row has n−1 or n−2 tokens, where n is the number of tokens from the bottom-most row, the row is also considered table data. In some examples, rows below the bottom-most rows are also examined. In this case, if a row has n−1 or n−2 tokens then row is considered a table row.

Eventually, a row 422 is found. This row includes four tokens, but no token has a numeric value. Since the maximum number of tokens in the table 420 is four, the row 422 is identified as the table header. The table header also indicates the end of the table 420. In an example, the table header row 422 is used to determine the keys of the table 420. Tokens from each table row may then be mapped to the keys. In an example, when the number of tokens in the header row is the same as the maximum number of tokens in the table data rows, the mapping is done one-to-one. In another example, a token is mapped to the key when the token overlaps one of the keys. There are times when the token in a table row does not overlap with the table header tokens. For example, the description header in the table 420 does not overlap with all of the values in the table data. In this case, the mapping from value to key can be done by finding the header token that is above and to the right of the value token.

Figure 5:
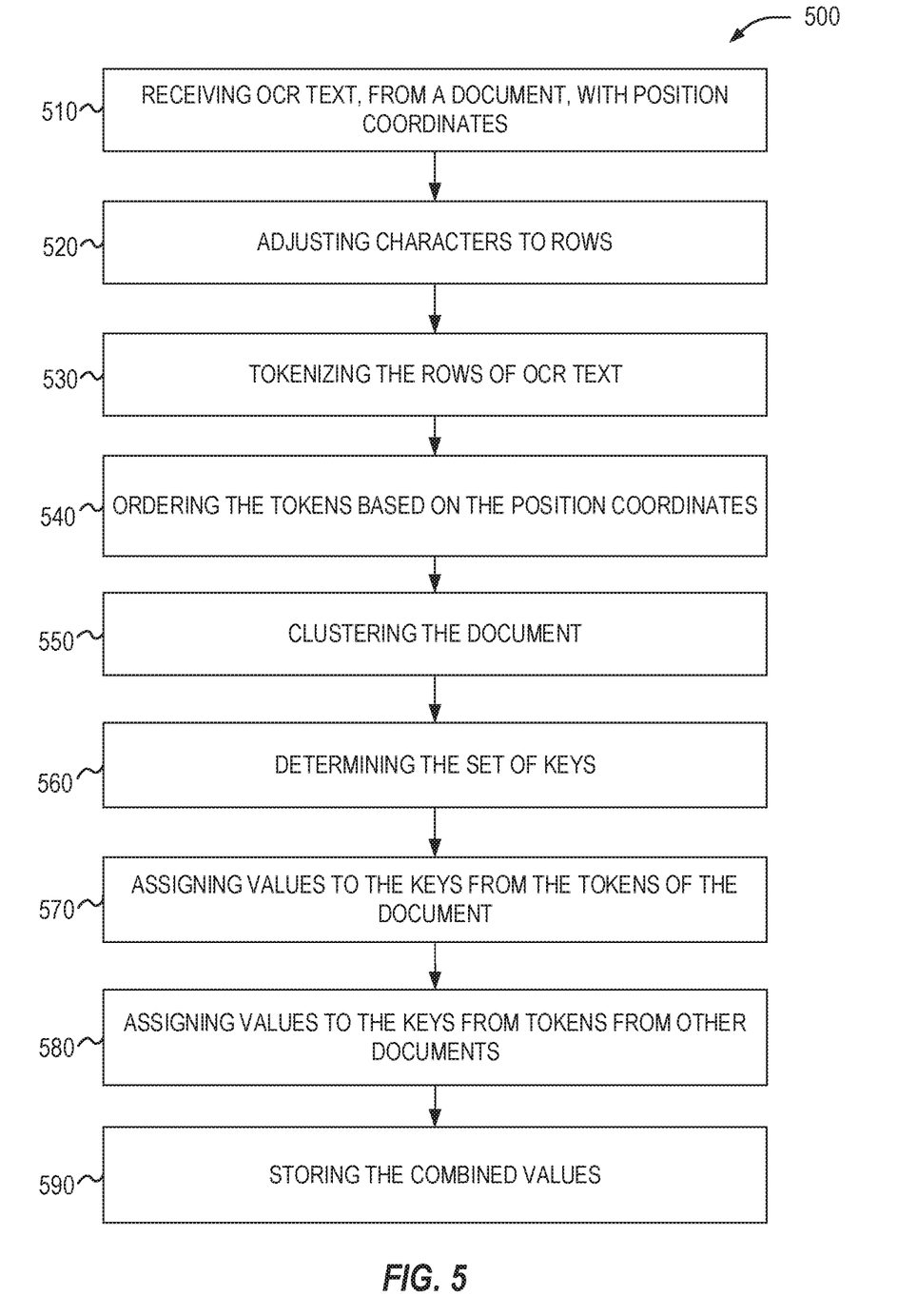
FIG. 5 is a flow diagram of a process for extracting keys and values from documents in accordance with respective examples.

FIG. 5 is a flow diagram of a process 500 for extracting keys and values from documents in accordance with respective examples. The process 500 may be executed on a computing device. At 510, OCR text of a document is received from an OCR system. The OCR text includes a position, such as an x,y coordinate, for each identified character. In addition, the OCR text may include a bounding box that indicates the height and the width of the character. The font and the font size of the characters may also be included in the OCR text.

At 520, the characters are aligned to rows within the document. This can be done by adjusting the y-coordinate of characters that are determined to be on the same row to have the same y-coordinate. In an example, the y-coordinate of a base character is used to find other characters that are within a predefined range of the base character. In an example, the predefined range is based on if the character overlaps with the base character. Determining if another character overlaps with the base character can be based on the bounding box of other characters. In another example, the overlap can be determined using an average height of the font and font size of the base character. In some examples, only characters that have the same size and font are aligned. If a different sized character does not have the same font and font size of the base character, the character is not adjusted based on the base character. The different sized character, however, may be adjusted based on other characters that have the font and font size as the different sized character.

At 530, the aligned rows of text are tokenized. For example, tokens are generated based on characters in the same row. A token may be generated based on the distance between characters. For example, characters that are within a predefined length from one another are joined to form a token. The characters can be examined in a left to right and top to bottom fashion. For example, a first character in the document can be determined. The first character can be the topmost and leftmost character in the document. Next, a set of characters that include no whitespace greater than a predetermined threshold between any character in the set of characters is determined. For example, the next character to the right is found. If that character is within the predetermined threshold and there is only whitespace between the first and next characters, the next character is added as part of the token. Once the next character is added, this character becomes the last character in the token. Then the character to the right of the last character is found and the distance is determined. The token, therefore, is built character by character until there are no more characters in a row, non-whitespace is found between the last character and the next character, or the next character is further than the predetermined distance from the last character. The token is then formed as the concatenation of the selected characters. In an example, the predetermined threshold is based on the width of the first character. For example, the predetermined threshold can be 2×, 4×, 6×, etc., the width of a letter in the font and font size of the first character. In an example, when the next character is a different font or font size, the token is considered complete and the next character is not added to the token. In this example, tokens include only characters that have the same font and font size. In addition, the position coordinates of the characters that make up the token can be used to generate position coordinates of the entire token. For example, the x,y coordinates of a rectangle that boxes the entire token can be determined and used as the position of the token.

At 540, the tokens are ordered based on their position coordinates. For example, the tokens can be ordered from left to right and top to bottom. The x,y coordinates of the tokens can be used to create this ordering. In various examples, the ordering of the tokens is important for matching the document with other similar documents. For example, lots of differently formatted invoices may include the token "Amount Due." These invoices, however, likely have the Amount Due token in a different location relative to other tokens within the invoice. Keeping an ordered list of tokens, allows matching or clustering to identify if two tokens from different invoices are in the same relative location.

At 550, the document can be clustered with other documents. The clustering can be based on the ordered list of tokens from the document and the ordered list of tokens from the other documents. In an example, the other documents have previously been clustered into different clusters. In another example, the document is used along with the other documents to determine the set of possible clusters. In an example, the clustering is done based on the location of tokens within the documents. The location of the tokens can be based on the ordered list of tokens associated with each document. In an example, k-means clustering based on the token alignments or the links between documents can be used to form the clusters. The document is assigned to a cluster that includes a first set of documents.

At 560, a set of keys for the cluster is determined based on the ordered list of tokens associated with the first set of documents. In an example, for token that is in any of the first set of documents, the number of documents that include that token is determined. In some examples, a token from one document is considered to be in another document when the tokens have the same character values and also the same relative location based on the ordered list of tokens. For example, if the tokens are within a range of one another in the order list of tokens the tokens are considered to be relatively in the same location. As an example, if one token is the $26^{th}$ token in the ordered list and another token with the character value is the $28^{th}$ token, the tokens can be determined to be within the same relative position. In another example, the position information can be compared directly to one another with an error window. In this example, two tokens are considered to be in the same position if their coordinates are within 3%, 5%, etc., of one another. The number of times the token is found to be in the same position in each document in the cluster is determined. If the token appeared in more than a threshold number of documents, the token is considered a key for that cluster. The threshold number of documents can be 25%, 30%, 50%, etc. of the number of documents in the cluster.

In some examples, the token may include both a key part separated from a value part by a separator. For example, a token may be generated as "Amount: $100.00." The distance between the ':' character and the '$' character may be close enough that the token includes both the key, "Amount" and the value "$100.00." To account for this, a token can be split based on known separators, such as, but not limited to, the ':' character and the tab character. The initial token is therefore split into two tokens: "Amount" and "$100.00". This separation can be part of the tokenization process or can be done when keys for a cluster are determined. In this example, the token "Amount" may be selected as a key based on other documents also include the "Amount" token but the token "$100.00" is more likely to be a value.

At 570, the tokens from the document are used to determine a value for the keys. To assign a value to a key, a token within the document that matches the key is found. If no token is found, the value for that key can be set of a known value, such as " ". If a token corresponding to the key is found, a search is done for a token to the right or for a token below the key. The search can be limited to tokens within a predefined range or distance from the key token. In an example, the search for values is done in an iterative style with each iteration increasing the range to capture tokens that are farther away from the key token. In an example, the last iteration can include a range that spans more than one half the width of the document. If a token is found within the range of the key token, the value of the key is set to the token. The key and the value can then be removed from the ordered list of tokens. Alternatively, the key and value tokens in the document can be indicated as found or paired. Later iterations can then ignore any token that has previously been paired. The tokens, however, remain in the ordered list and may be used to constrain the values of other keys as described below.

A second iteration can be done to match values with keys. In the second iteration, the distance between the key token and a value token is increased. Accordingly, during the second iteration tokens that were not considered to be a value in the first iteration can be considered a value in the second iteration. This can occur if a value token is farther than the distance used in the first iteration from the key but within the distance used in the second iteration from the key. Values can then be found and updated as done in the first iteration. Additional iterations can be done. For example, four iterations can be done such that the last iteration uses a distance that is 50%, 60%, 75%, etc., the width of the document.

After a first value token is found for a key, additional value tokens can be found that are part of the value for the key. In an example, an additional token is found that overlaps with the first value token. In some examples, the additional token is within a predefined distance from the first value token to be considered as part of the value. If the additional token is within the predefined distance and overlaps with the first value token, the additional token is also part of the value for the key. In some examples, there is no empty space between values on different rows. In these examples, the first empty row found below the value of the token will stop the process of finding additional values. In an example, the additional token is below the first value token. In this example, tokens to the right of the first value token are not considered. Further additional tokens can be searched for to continue to expand the value of the key. In this example, a maximum distance can be used to limit how far to search for additional tokens. For example, the maximum distance may be three rows of text.

After the values are extracted, a confidence score can be generated for the entire document that measures how many of the keys from the cluster were found in the document and how many values of those keys were found. This confidence score can be used to flag a potentially misclustered document. In an example, the confidence score is calculated as the number of keys found plus the number of values found divided by twice the number of keys in the cluster. If the confidence score is below some threshold, 60%, 50%, 25%, etc., the document can be flagged as potentially being in the wrong cluster. This confidence score can be used to automatically determine when a new type of document is being processed since a new type of document will not be formatted in the same way as previously seen documents.

At 580, values are extracted from the other documents within the cluster. The keys and values from the documents in the cluster can be combined. For example, a table can be generated with a column for each of the keys. Each row of the table can be generated from the values from one document, such that the table has a row for each of the documents in the cluster. At 590, the keys and combined values can be stored. For example, the generated table can be stored to a file.

In addition to a document confidence score, a confidence score for each of the extracted values can be determined. For example, all of the values for a key can be examined. These values can then be examined for outliers. In an example, the values can be examined to determine how many of the values are numeric values. If all values but one are numeric and the other value contains characters, the confidence of the character value can be one divided by the number of values. This confidence score can be included in the table. In addition, a table can be generated where values that have a confidence below a certain threshold, such as 10%, 20%, 30%, etc., can be filtered out from the table. The number of characters or digits in the values and the values themselves can also be examined and used to calculate the confidence score. If the majority of values have the same number of characters, then any value that has a different number of characters can have a lower confidence value. In addition, some values will be the same across the documents. When more than a threshold, such as 50%, 60%, 70%, etc. of documents have the same value for a key, values that have a different value can have a lower confidence score.

In addition to extracting keys and values from documents, some examples can also extract a table from the document. The table can be extracted any time after the rows of text are aligned. To extract the table, the row with the most tokens from the bottom of the document is determined. This row is the bottom row of the table. In an example, the row has to include a number of numeric values to be considered a table row. Otherwise, the row is ignored. In an example, the number of numeric tokens needed may be 2, 3, etc., tokens or may be a percentage such as 20%, 40%, etc. of tokens. Once the bottom row is determined, rows above the bottom row are examined. Any row that includes the same number of tokens and also has numeric tokens is considered a table body row. In an example, if a row contains the same number of tokens as the bottom row or more than n−2 tokens, where n is the maximum number of tokens in the bottom row, then the row is considered a table row. If a row is found that has the same number of tokens or n−2 tokens, but does not include any numeric tokens, this row is considered the table header row and is the last row of the table. The tokens in the header row can be considered the keys for the table. The table body rows can have a value for each of the keys of the table. Any token that is part of the table can be indicated as not available for extracting values for keys of the cluster. This helps eliminate errors with a key from the cluster matching a table header token or token that is part of the table body.

Figure 6:
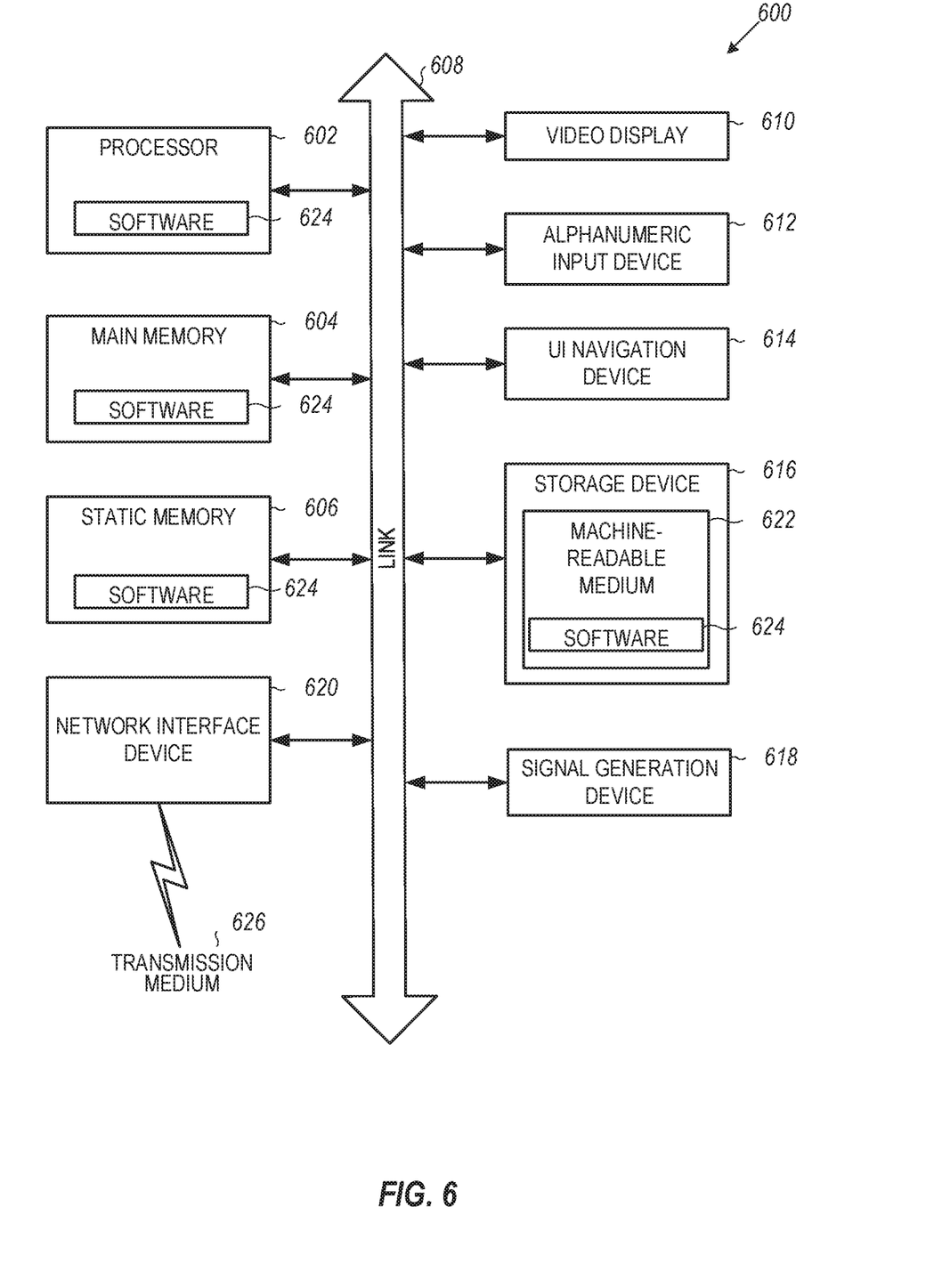
FIG. 6 is an example computing device that can be used in conjunction with the technologies described herein.

FIG. 6 is an example computing device that can be used in conjunction with the technologies described herein. In alternative embodiments, the computing device 600 may operate as a standalone device or may be connected (e.g., networked) to other computing devices. In a networked deployment, the computing device 600 may operate in the capacity of a server communication device, a client communication device, or both in server-client network environments. In an example, the computing device 600 may act as a peer computing device in peer-to-peer (P2P) (or other distributed) network environment. The computing device 600 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations. Computing device may implement the OCR system 120, the aligner 130, the tokenizer 140, the cluster 150, the table extractor 310, and the table combiner 320, and perform the method of FIG. 5.

Computing device 600 may include a hardware processor 602 (e.g., a central processing unit (CPU), a graphics processing unit (GPU), a hardware processor core, or any combination thereof), a main memory 604 and a static memory 606, some or all of which may communicate with each other via a link (e.g., bus) 608. The computing device 600 may further include a display unit 610, an input device 612 (e.g., a keyboard), and a user interface (UI) navigation device 614 (e.g., a mouse). In an example, the display unit 610, input device 612, and UI navigation device 614 may be a touch screen display. In an example, the input device 612 may include a touchscreen, a microphone, a camera (e.g., a panoramic or high-resolution camera), physical keyboard, trackball, or other input devices.

The computing device 600 may additionally include a storage device (e.g., drive unit) 616, a signal generation device 618 (e.g., a speaker, a projection device, or any other type of information output device), a network interface device 620, and one or more sensors 621, such as a global positioning system (GPS) sensor, compass, accelerometer, motion detector, or other sensor. The computing device 600 may include an input/output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 616 may include a computing-readable (or machine-readable) storage media 622, on which is stored one or more sets of data structures or instructions 624 (e.g., software) embodying or utilized by any one or more of the techniques or functions described herein. In an example, at least a portion of the software may include an operating system and/or one or more applications (or apps) implementing one or more of the functionalities described herein. The instructions 624 may also reside, completely or at least partially, within the main memory 604, within the static memory 606, and/or within the hardware processor 602 during execution thereof by the computing device 600. In an example, one or any combination of the hardware processor 602, the main memory 604, the static memory 606, or the storage device 616 may constitute computing device (or machine) readable media.

While the computer-readable storage media 622 is illustrated as a single medium, a "computer-readable storage media" or "machine-readable storage media" may include a single medium or multiple media (e.g., a centralized or distributed database, and/or associated caches and servers) configured to store the one or more instructions 624.

In an example, a computer-readable storage media or machine-readable storage media may include any medium that is capable of storing, encoding, or carrying instructions for execution by the computing device 600 and that cause the computing device 600 to perform any one or more of the techniques of the present disclosure, or that is capable of storing, encoding or carrying data structures used by or associated with such instructions. Non-limiting computer-readable storage media examples may include solid-state memories, and optical and magnetic media. Specific examples of computer-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. The computer-readable storage media is non-transitory in that the storage media does not consist of transitory propagating signals.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. The network interface device 620 may use the transfer protocols to transmit data using transitory propagating signals.

In an example, the network interface device 620 may include one or more physical jacks (e.g., Ethernet, coaxial, or phone jacks) or one or more antennas to connect to the communications network 626. In an example, the network interface device 620 may include one or more wireless modems, such as a Bluetooth modem, a Wi-Fi modem or one or more modems or transceivers operating under any of the communication standards mentioned herein. In an example, the network interface device 620 may include a plurality of antennas to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. In an example, a transmission medium may include any intangible medium that is capable of storing, encoding or carrying instructions for execution by the computing device 600, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

EXAMPLES

Example 1 is a method for extracting key value data, the method comprising: receiving optical character recognition (OCR) text of a document, wherein characters within the OCR text are associated with an x,y coordinate; adjusting the y-coordinate of characters to a common y-coordinate based on the y-coordinate of the characters being within a predefined range of one another; tokenizing the rows of OCR text into tokens based on a distance between characters; ordering the tokens based on the x,y coordinates of the characters; clustering the document into a cluster based on the ordered tokens and ordered tokens from other documents, wherein the other documents include, the first set of documents, and wherein the cluster includes keys from the first set of documents; determining a set of keys for the cluster from a first set of documents, wherein each key in the set of keys is a token from a first set of documents; assigning a value to each of the set of keys based on the tokens for the document; assigning values to each of the set of keys for each of the other documents; and storing the values for the document and the values for the other documents in an output document.

In Example 2, the subject matter of Example 1 includes, wherein adjusting the y-coordinate comprises: determining a y-coordinate of a first character; determining a set of characters that overlap with the y-coordinate of the first character based on the y-coordinate of characters in the set of characters; and adjusting the y-coordinate of the characters in the set of characters to be the y-coordinate of the first character.

In Example 3, the subject matter of Examples 1-2 includes, wherein tokenizing the rows of OCR text comprises: determining a first character in the document, wherein the first character is a top left character in the document; and determining a set of characters close to the first character to form a token, wherein the characters of the token are on a same row and have a same font size, and wherein there is no whitespace greater than a predetermined threshold between any characters of the token.

In Example 4, the subject matter of Examples 1-3 includes, wherein ordering the tokens comprises ordering the tokens from left to right and from top to bottom.

In Example 5, the subject matter of Examples 1-4 includes, wherein determining the set of keys comprises: counting a number documents a token appears in the first set of documents in a common location based on ordered tokens from the first set of documents; determining a token appears in more than a key threshold number of documents; and selecting the token as a key for the cluster.

In Example 6, the subject matter of Example 5 includes, determining the token includes a separator character; and removing the separator character and any characters following the separator character from the token prior to counting the token.

In Example 7, the subject matter of Examples 1-6 includes, wherein assigning values to each of the set of keys for the document comprises: for each key in the set of keys: determining if a token is within a first predefined distance of the key; assigning the token as a value of the key if the token is within the first predefined distance of the key; removing the key from the set of keys; for each remaining key in the set of keys: determining if a token is within a second predefined distance of the key, wherein the second predefined distance is greater than the first predefined distance; and assigning the token as a value of the key if the token is within the second predefined distance of the key.

In Example 8, the subject matter of Example 7 includes, determining a second token overlaps a token that is a value of a key; determining the second token is within a predefined distance from the token that is the value of a key; and adding the second token to the value of the key based on determining the second token overlaps and is within a predefined distance from the token that is the value of the key.

In Example 9, the subject matter of Examples 1-8 includes, extracting a table body and a table header from the ordered tokens of the document, wherein the table body includes rows of data associated with the table header wherein extracting the table body comprises: determining a first row of tokens from a bottom of the document that includes a largest number of tokens with a row; determining a header row above the first row of tokens, based on the header row including a number of tokens within a predefined number of tokens from the first row, and wherein the tokens in the header row do not have numeric values, and determining table body rows above the first row that include a same number of tokens as the first row, and wherein the table rows are below the header row.

Example 10 is a system for extracting key value data, the system comprising: an electronic processor configured to: receive optical character recognition (OCR) text of a document, wherein characters within the OCR text are associated with an x,y coordinate; adjust the y-coordinate of characters to a common y-coordinate based on the y-coordinate of the characters being within a predefined range of one another; tokenize the rows of OCR text into tokens based on a distance between characters; order the tokens based on the x,y coordinates of the characters; cluster the document into a cluster based on the ordered tokens and ordered tokens from other documents, wherein the other documents include, the first set of documents, and wherein the cluster includes keys from the first set of documents; determine a set of keys for the cluster from a first set of documents, wherein each key in the set of keys is a token from a first set of documents; assign a value to each of the set of keys based on the tokens for the document; assign values to each of the set of keys for each of the other documents; and store the values for the document and the values for the other documents in an output document.

In Example 11, the subject matter of Example 10 includes, wherein to adjust the y-coordinate the electronic processor is configured to: determine a y-coordinate of a first character; determine a set of characters that overlap with the y-coordinate of the first character based on the y-coordinate of characters in the set of characters; and adjust the y-coordinate of the characters in the set of characters to be the y-coordinate of the first character.

In Example 12, the subject matter of Examples 10-11 includes, wherein to tokenize the rows of OCR text the electronic processor is configured to: determine a first character in the document, wherein the first character is a top left character in the document; and determine a set of characters close to the first character to form a token, wherein the characters of the token are on a same row and have a same font size, and wherein there is no whitespace greater than a predetermined threshold between any characters of the token.

In Example 13, the subject matter of Examples 10-12 includes, wherein to order the tokens the electronic processor is configured to order the tokens from left to right and from top to bottom.

In Example 14, the subject matter of Examples 10-13 includes, wherein to determine the set of keys the electronic processor is configured to: count a number documents a token appears in the first set of documents in a common location based on ordered tokens from the first set of documents; determine a token appears in more than a key threshold number of documents; and select the token as a key for the cluster.

In Example 15, the subject matter of Example 14 includes, wherein the electronic processor is further configured to: determine the token includes a separator character; and remove the separator character and any characters following the separator character from the token prior to counting the token.

In Example 16, the subject matter of Examples 10-15 includes, wherein to assign values to each of the set of keys for the document the electronic processor is configured to: for each key in the set of keys: determine if a token is within a first predefined distance of the key; assign the token as a value of the key if the token is within the first predefined distance of the key; remove the key from the set of keys; for each remaining key in the set of keys: determine if a token is within a second predefined distance of the key, wherein the second predefined distance is greater than the first predefined distance; and assign the token as a value of the key if the token is within the second predefined distance of the key.

In Example 17, the subject matter of Example 16 includes, wherein the electronic processor is further configured to: determine a second token overlaps a token that is a value of a key; determine the second token is within a predefined distance from the token that is the value of a key;

and add the second token to the value of the key based on determining the second token overlaps and is within a predefined distance from the token that is the value of the key.

In Example 18, the subject matter of Examples 10-17 includes, wherein the electronic processor is further configured to extract a table body and a table header from the ordered tokens of the document, wherein the table body includes rows of data associated with the table header wherein extracting the table body comprises: determine a first row of tokens from a bottom of the document that includes a largest number of tokens with a row; and determine a header row above the first row of tokens, based on the header row including a number of tokens within a predefined number of tokens from the first row, and wherein the tokens in the header row do not have numeric values.

Example 19 is a computer-readable storage medium storing computer-executable instructions for extracting key value data, the stored instructions comprising: instructions to receive optical character recognition (OCR) text of a document, wherein characters within the OCR text are associated with an x,y coordinate; instructions to adjust the y-coordinate of characters to a common y-coordinate based on the y-coordinate of the characters being within a predefined range of one another; instructions to tokenize the rows of OCR text into tokens based on a distance between characters; instructions to order the tokens based on the x,y coordinates of the characters; instructions to cluster the document into a cluster based on the ordered tokens and ordered tokens from other documents, wherein the other documents include, the first set of documents, and wherein the cluster includes keys from the first set of documents; instructions to determine a set of keys for the cluster from a first set of documents, wherein each key in the set of keys is a token from a first set of documents; instructions to assign a value to each of the set of keys based on the tokens for the document; instructions to assign values to each of the set of keys for each of the other documents; and instructions to store the values for the document and the values for the other documents in an output document.

In Example 20, the subject matter of Example 19 includes, wherein the instructions to adjust the y-coordinate comprise: instructions to determine a y-coordinate of a first character; instructions to determine a set of characters that overlap with the y-coordinate of the first character based on the y-coordinate of characters in the set of characters; and instructions to adjust the y-coordinate of the characters in the set of characters to be the y-coordinate of the first character.

In Example 21, the subject matter of Examples 19-20 includes, wherein c to tokenize the rows of OCR text comprise: instructions to determine a first character in the document, wherein the first character is a top left character in the document; and instructions to determine a set of characters close to the first character to form a token, wherein the characters of the token are on a same row and have a same font size, and wherein there is no whitespace greater than a predetermined threshold between any characters of the token.

In Example 22, the subject matter of Examples 19-21 includes, wherein instructions to order the tokens comprise instructions to order the tokens from left to right and from top to bottom.

In Example 23, the subject matter of Examples 19-22 includes, wherein instructions to determine the set of keys comprise: instructions to count a number documents a token appears in the first set of documents in a common location based on ordered tokens from the first set of documents; instructions to determine a token appears in more than a key threshold number of documents; and instructions to select the token as a key for the cluster.

In Example 24, the subject matter of Example 23 includes, wherein the instructions further comprise: instructions to determine the token includes a separator character; and instructions to remove the separator character and any characters following the separator character from the token prior to counting the token.

In Example 25, the subject matter of Examples 19-24 includes, wherein instructions to assign values to each of the set of keys for the document comprise: for each key in the set of keys: instructions to determine if a token is within a first predefined distance of the key; instructions to assign the token as a value of the key if the token is within the first predefined distance of the key; instructions to remove the key from the set of keys; for each remaining key in the set of keys: instructions to determine if a token is within a second predefined distance of the key, wherein the second predefined distance is greater than the first predefined distance; and instructions to assign the token as a value of the key if the token is within the second predefined distance of the key.

In Example 26, the subject matter of Example 25 includes, wherein the instructions further comprise: instructions to determine a second token overlaps a token that is a value of a key; instructions to determine the second token is within a predefined distance from the token that is the value of a key; and instructions to add the second token to the value of the key based on determining the second token overlaps and is within a predefined distance from the token that is the value of the key.

In Example 27, the subject matter of Examples 19-26 includes, wherein the instructions further comprise instructions to extract a table body and a table header from the ordered tokens of the document, wherein the table body includes rows of data associated with the table header wherein extracting the table body comprises: instructions to determine a first row of tokens from a bottom of the document that includes a largest number of tokens with a row; and instructions to determine a header row above the first row of tokens, based on the header row including a number of tokens within a predefined number of tokens from the first row, and wherein the tokens in the header row do not have numeric values.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A method for extracting key value data, the method comprising:
receiving optical character recognition (OCR) text of a document, wherein characters within the OCR text are associated with an x,y coordinate;
adjusting the y-coordinate of characters to a common y-coordinate based on the y-coordinate of the characters being within a predefined range of one another to create rows of OCR text;
tokenizing the rows of OCR text into tokens based on a distance between characters, wherein a token comprises one or more characters;
ordering the tokens based on the x,y coordinates of the characters;
clustering the document into a cluster based on the ordered tokens and ordered tokens from other documents, wherein the cluster includes a first set of documents, and wherein the other documents include the first set of documents;
determining a set of keys for the cluster from the first set of documents, wherein each key in the set of keys is a token from a first set of documents;
assigning a value to each of the set of keys based on the tokens for the document;
assigning values to each of the set of keys for each of the other documents; and
storing the values for the document and the values for the other documents in an output document.

2. The method of claim 1, wherein adjusting the y-coordinate comprises:
determining a y-coordinate of a first character;
determining a set of characters that overlap with the y-coordinate of the first character based on the y-coordinate of characters in the set of characters; and
adjusting the y-coordinate of the characters in the set of characters to be the y-coordinate of the first character.

3. The method of claim 1, wherein tokenizing the rows of OCR text comprises:
determining a first character in the document, wherein the first character is a top left character in the document; and
determining a set of characters close to the first character to form a token, wherein the characters of the token are on a same row and have a same font size, and wherein there is no whitespace greater than a predetermined threshold between any characters of the token.

4. The method of claim 1, wherein ordering the tokens comprises ordering the tokens from left to right and from top to bottom.

5. The method of claim 1, wherein determining the set of keys comprises:
counting a number documents a token appears in the first set of documents in a common location based on ordered tokens from the first set of documents;
determining a token appears in more than a key threshold number of documents; and
selecting the token as a key for the cluster.

6. The method of claim 5, further comprising:
determining the token includes a separator character; and
removing the separator character and any characters following the separator character from the token prior to counting the token.

7. The method of claim 1, wherein assigning values to each of the set of keys for the document comprises:

for each key in the set of keys:
determining if a token is within a first predefined distance of the key;
assigning the token as a value of the key if the token is within the first predefined distance of the key;
removing the key from the set of keys;
for each remaining key in the set of keys:
determining if a token is within a second predefined distance of the key, wherein the second predefined distance is greater than the first predefined distance; and
assigning the token as a value of the key if the token is within the second predefined distance of the key.

8. The method of claim 7, further comprising:
determining a second token overlaps a token that is a value of a key;
determining the second token is within a predefined distance from the token that is the value of a key; and
adding the second token to the value of the key based on determining the second token overlaps and is within a predefined distance from the token that is the value of the key.

9. The method of claim 1, further comprising extracting a table body and a table header from the ordered tokens of the document, wherein the table body includes rows of data associated with the table header wherein extracting the table body comprises:
determining a first row of tokens from a bottom of the document that includes a largest number of tokens with a row;
determining a header row above the first row of tokens, based on the header row including a number of tokens within a predefined number of tokens from the first row, and wherein the tokens in the header row do not have numeric values; and
determining table body rows above the first row that include a same number of tokens as the first row, and wherein the table rows are below the header row.

10. A system for extracting key value data, the system comprising:
an electronic processor configured to:
receive optical character recognition (OCR) text of a document, wherein characters within the OCR text are associated with an x,y coordinate;
adjust the y-coordinate of characters to a common y-coordinate based on the y-coordinate of the characters being within a predefined range of one another to create rows of OCR text;
tokenize the rows of OCR text into tokens based on a distance between characters, wherein a token comprises one or more characters;
order the tokens based on the x,y coordinates of the characters;
cluster the document into a cluster based on the ordered tokens and ordered tokens from other documents, wherein the other documents include the first set of documents, and wherein the cluster includes keys from the first set of documents;
determine a set of keys for the cluster from a first set of documents, wherein each key in the set of keys is a token from a first set of documents;
assign a value to each of the set of keys based on the tokens for the document;
assign values to each of the set of keys for each of the other documents; and
store the values for the document and the values for the other documents in an output document.

11. The system of claim 10, wherein to adjust the y-coordinate the electronic processor is configured to:
   determine a y-coordinate of a first character;
   determine a set of characters that overlap with the y-coordinate of the first character based on the y-coordinate of characters in the set of characters; and
   adjust the y-coordinate of the characters in the set of characters to be the y-coordinate of the first character.

12. The system of claim 10, wherein to tokenize the rows of OCR text the electronic processor is configured to:
   determine a first character in the document, wherein the first character is a top left character in the document; and
   determine a set of characters close to the first character to form a token, wherein the characters of the token are on a same row and have a same font size, and wherein there is no whitespace greater than a predetermined threshold between any characters of the token.

13. The system of claim 10, wherein to order the tokens the electronic processor is configured to order the tokens from left to right and from top to bottom.

14. The system of claim 10, wherein to determine the set of keys the electronic processor is configured to:
   count a number documents a token appears in the first set of documents in a common location based on ordered tokens from the first set of documents;
   determine a token appears in more than a key threshold number of documents; and
   select the token as a key for the cluster.

15. The system of claim 14, wherein the electronic processor is further configured to:
   determine the token includes a separator character; and
   remove the separator character and any characters following the separator character from the token prior to counting the token.

16. The system of claim 10, wherein the electronic processor is further configured to extract a table body and a table header from the ordered tokens of the document, wherein the table body includes rows of data associated with the table header wherein extracting the table body comprises:
   determine a first row of tokens from a bottom of the document that includes a largest number of tokens with a row; and
   determine a header row above the first row of tokens, based on the header row including a number of tokens within a predefined number of tokens from the first row, and wherein the tokens in the header row do not have numeric values.

17. A computer-readable storage medium storing computer-executable instructions for extracting key value data, the stored instructions comprising:
   instructions to receive optical character recognition (OCR) text of a document, wherein characters within the OCR text are associated with an x,y coordinate;
   instructions to adjust the y-coordinate of characters to a common y-coordinate based on the y-coordinate of the characters being within a predefined range of one another to create rows of OCR text;
   instructions to tokenize the rows of OCR text into tokens based on a distance between characters, wherein a token comprises one or more characters;
   instructions to order the tokens based on the x,y coordinates of the characters;
   instructions to cluster the document into a cluster based on the ordered tokens and ordered tokens from other documents, wherein the other documents include the first set of documents, and wherein the cluster includes keys from the first set of documents;
   instructions to determine a set of keys for the cluster from a first set of documents, wherein each key in the set of keys is a token from a first set of documents;
   instructions to assign a value to each of the set of keys based on the tokens for the document;
   instructions to assign values to each of the set of keys for each of the other documents; and
   instructions to store the values for the document and the values for the other documents in an output document.

18. The computer-readable storage medium of claim 17, wherein the instructions to adjust the y-coordinate comprise:
   instructions to determine a y-coordinate of a first character;
   instructions to determine a set of characters that overlap with the y-coordinate of the first character based on the y-coordinate of characters in the set of characters; and
   instructions to adjust the y-coordinate of the characters in the set of characters to be the y-coordinate of the first character.

19. The computer-readable storage medium of claim 17, wherein c to tokenize the rows of OCR text comprise:
   instructions to determine a first character in the document, wherein the first character is a top left character in the document; and
   instructions to determine a set of characters close to the first character to form a token, wherein the characters of the token are on a same row and have a same font size, and wherein there is no whitespace greater than a predetermined threshold between any characters of the token.

20. The computer-readable storage medium of claim 17, wherein instructions to order the tokens comprise instructions to order the tokens from left to right and from top to bottom.

* * * * *